(12) United States Patent
Wang et al.

(10) Patent No.: US 12,127,023 B2
(45) Date of Patent: Oct. 22, 2024

(54) APPARATUS AND A METHOD FOR CONFIGURATING AND REPORTING OF MINIMIZATION OF DRIVE TESTS MEASUREMENT AND ACCESS NETWORK DEVICE

(71) Applicant: Samsung Electronics Co., Ltd., Suwon-si (KR)

(72) Inventors: Hong Wang, Beijing (CN); Lixiang Xu, Beijing (CN); Weiwei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 17/280,492

(22) PCT Filed: Sep. 27, 2019

(86) PCT No.: PCT/KR2019/012661
§ 371 (c)(1),
(2) Date: Mar. 26, 2021

(87) PCT Pub. No.: WO2020/067812
PCT Pub. Date: Apr. 2, 2020

(65) Prior Publication Data
US 2022/0030454 A1    Jan. 27, 2022

(30) Foreign Application Priority Data

Sep. 27, 2018 (CN) .......................... 201811133679.6
Mar. 28, 2019 (CN) .......................... 201910244776.0
(Continued)

(51) Int. Cl.
*H04W 24/10* (2009.01)
*H04L 41/0803* (2022.01)

(52) U.S. Cl.
CPC ......... *H04W 24/10* (2013.01); *H04L 41/0803* (2013.01)

(58) Field of Classification Search
CPC ... H04W 24/10; H04W 88/085; H04W 24/08; H04L 41/0803
See application file for complete search history.

(56) References Cited

U.S. PATENT DOCUMENTS 10,602,508 B2    3/2020    Tavildar et al.
11,051,173 B2    6/2021    Lou et al.
(Continued)

FOREIGN PATENT DOCUMENTS

CN    102892129 A    1/2013
CN    103037428 A    4/2013
(Continued)

OTHER PUBLICATIONS

European Search Report dated Nov. 9, 2021, issued in European Application No. 19867690.0.
(Continued)

*Primary Examiner* — Steven Hieu D Nguyen
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). The present application provides a configuration method, a reporting method of a minimization of drive tests (MDT) measurement and an access network device, wherein the configuration method comprises: receiving, by a user node of an access network (CU-UP), a configuration information of MDT from an operation and maintenance node; transmitting, by the CU-UP, the configuration information of MDT to a control node of an access network (CU-CP);
(Continued)

receiving, by the CU-UP, the configuration information of MDT for UE from the CU-CP. The MDT under a separate architecture is achieved by the present application.

20 Claims, 6 Drawing Sheets

(30) Foreign Application Priority Data

| | | |
|---|---|---|
| Jul. 15, 2019 | (CN) | 201910637646.3 |
| Sep. 20, 2019 | (CN) | 201910893870.9 |
| Sep. 26, 2019 | (CN) | 201910920300.4 |

(56) References Cited

U.S. PATENT DOCUMENTS

| | | | |
|---|---|---|---|
| 2013/0114446 A1* | 5/2013 | Liu | H04W 24/10 370/252 |
| 2013/0128756 A1* | 5/2013 | Zhang | H04W 4/06 370/252 |
| 2013/0178211 A1* | 7/2013 | Wang | H04W 24/02 455/436 |
| 2014/0248868 A1 | 9/2014 | Wang et al. | |
| 2015/0023180 A1* | 1/2015 | Feng | H04W 8/24 370/241.1 |
| 2015/0181451 A1* | 6/2015 | Hapsari | H04W 24/10 455/456.1 |
| 2015/0341784 A1* | 11/2015 | Wang | H04W 24/06 455/423 |
| 2017/0238169 A1 | 8/2017 | Siomina | |
| 2021/0075496 A1* | 3/2021 | Mildh | H04W 40/22 |
| 2021/0120448 A1* | 4/2021 | Zhang | H04W 76/18 |
| 2021/0243625 A1 | 8/2021 | Hong | |

FOREIGN PATENT DOCUMENTS

| | | |
|---|---|---|
| CN | 107925541 A | 4/2018 |
| CN | 108347751 A | 7/2018 |
| CN | 108521877 A | 9/2018 |
| WO | 2013/072782 A1 | 5/2013 |

OTHER PUBLICATIONS

3GPP TS 32.422, 3rd Generation Partnership Project; Technical Specification Group Services and System Aspects; Telecommunication management; Subscriber and equipment trace; Trace control and configuration management; Jun. 2018.

3GPP TS 37.320, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Jun. 2018.

3GPP TS 36.423, 3rd Generation Partnership Project; Technical Specification Group Radio Access Network; Evolved Universal Terrestrial Radio Access Network (E-UTRAN);X2 application protocol (X2AP); Sep. 2018.

Huawei, RAN3 impacts of MDT, R3-103280, 3GPP TSG RAN WG3 #70, Nov. 19, 2010, Jacksonville, USA.

Chinese Notice of Allowance dated May 7, 2022, issued in Chinese Application No. 201910920300.4.

European Office Action dated Jan. 25, 2024, issued in European Patent Application No. 19867690.0.

Nokia, Add support for 5G Trace, 3GPP TSG-SA5 Meeting #119, S5-183290, May 18, 2018, La Jolla, United Sates.

ZTE, China Unicom, , Discussion on CU DU ID and NCGI, 3GPP TSG RAN WG3 NR AD HOC, R3-172417, Jun. 29, 2017, Qingdao, China.

Chinese Office Action dated Aug. 31, 2024, issued in Chinese Patent Application No. 202210869137.5.

* cited by examiner

[Fig. 1]
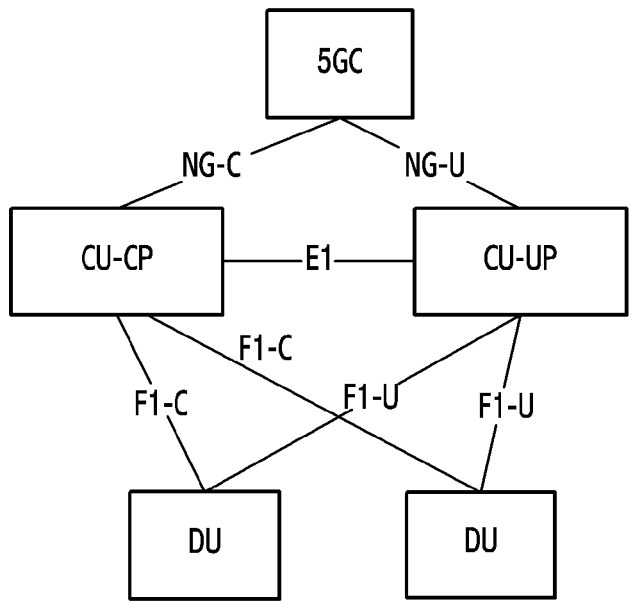
[Fig. 2]
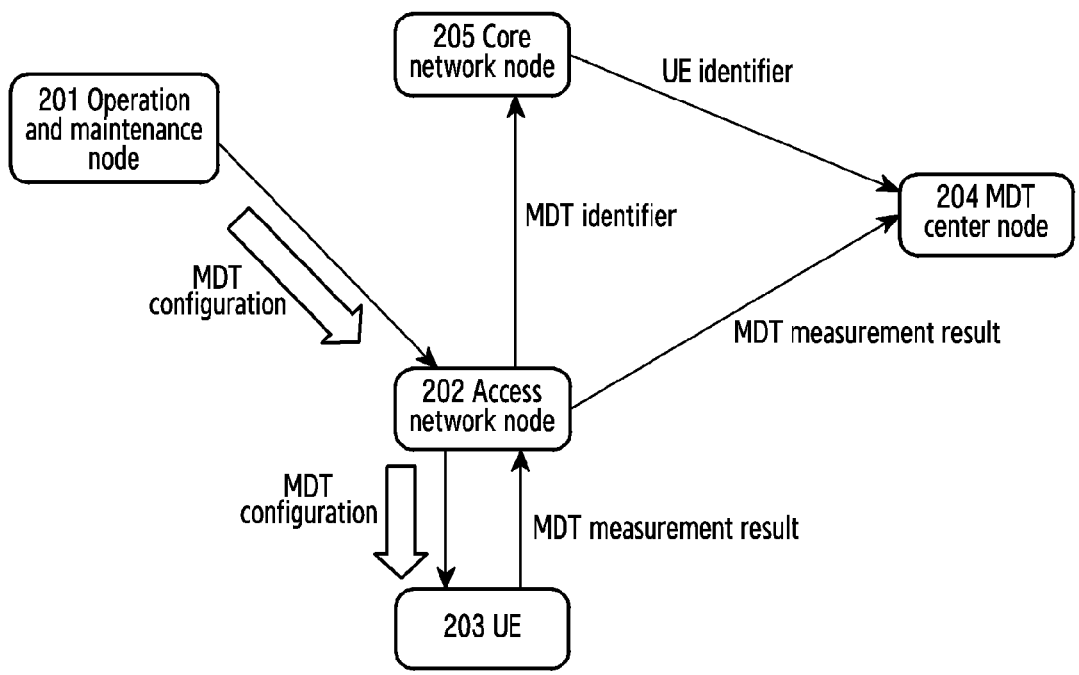

[Fig. 3]
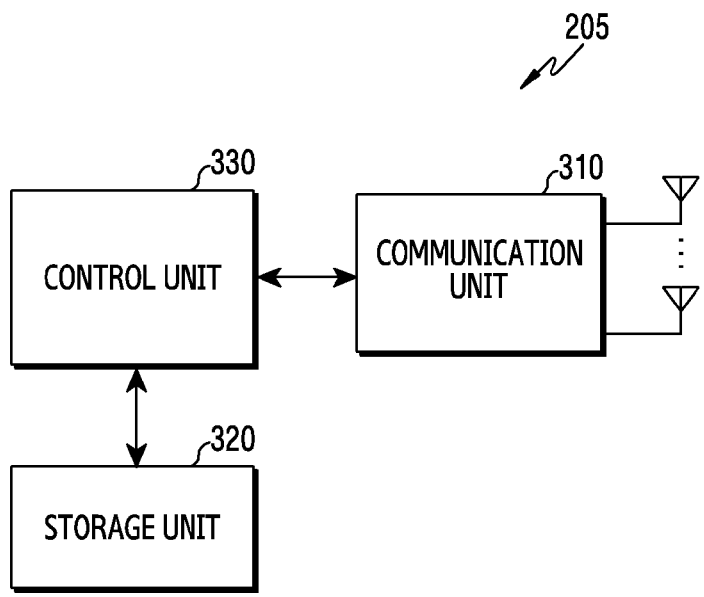
[Fig. 4]
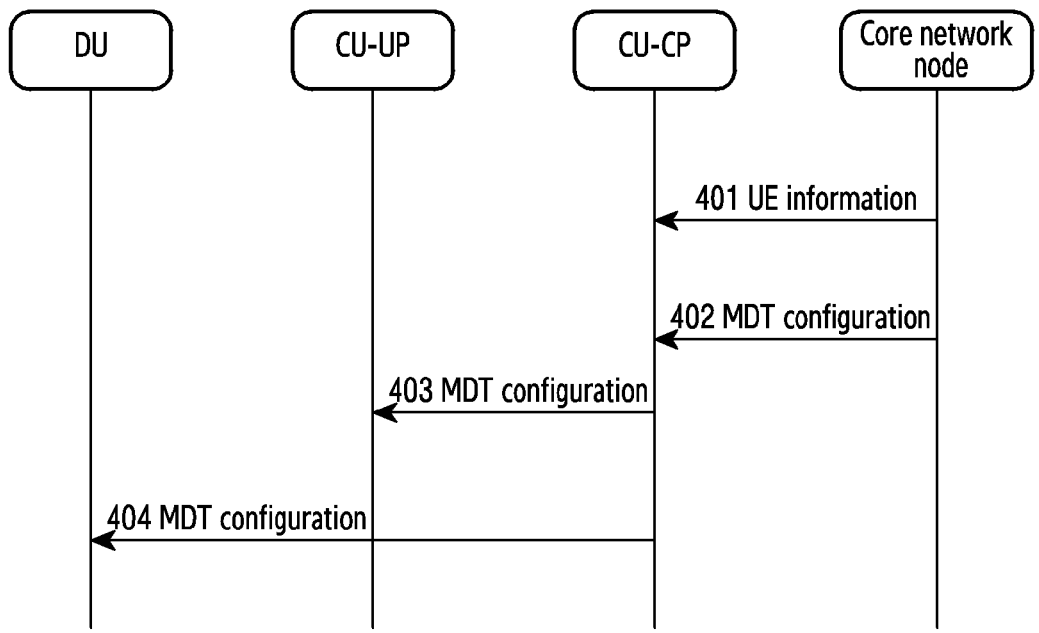

[Fig. 5]
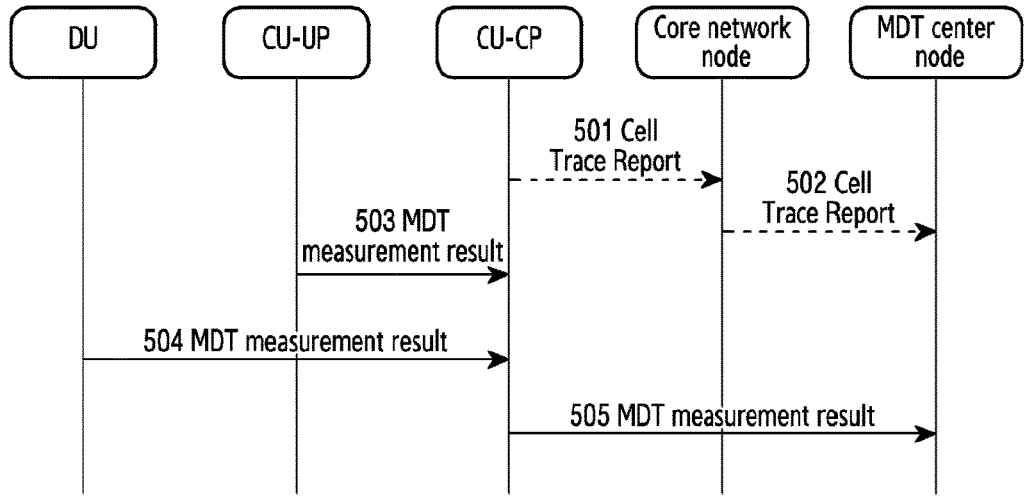
[Fig. 6]
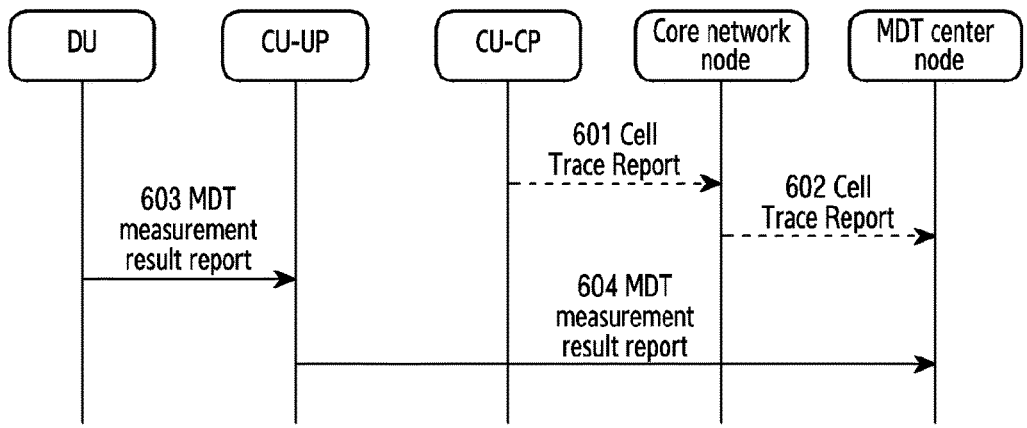
[Fig. 7]
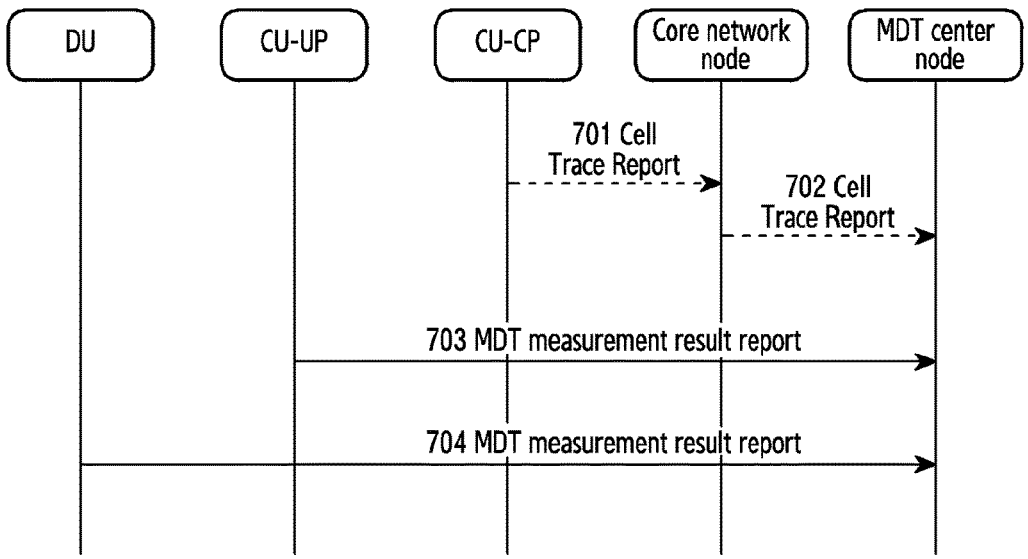

[Fig. 8]
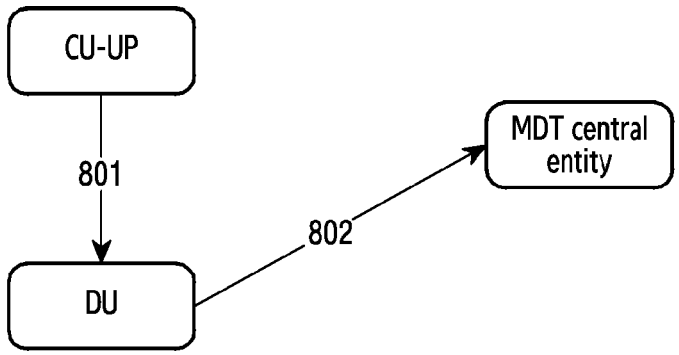
[Fig. 9]
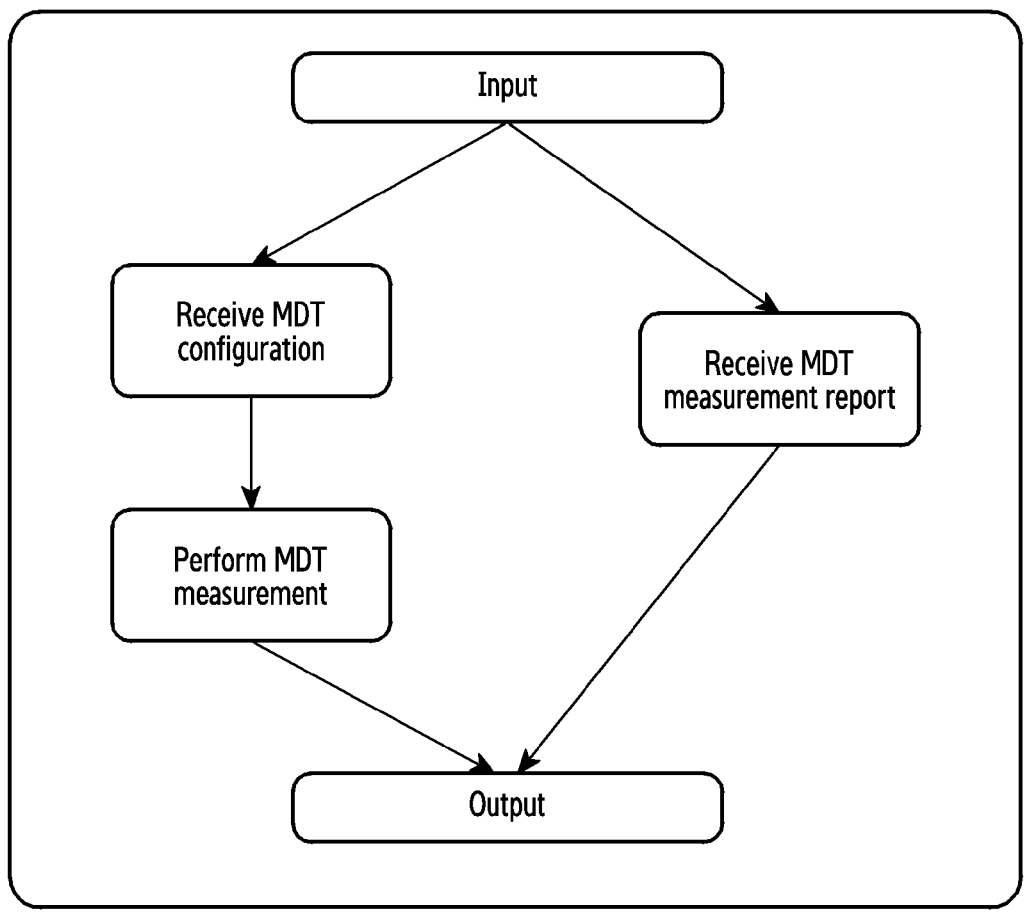

[Fig. 10]
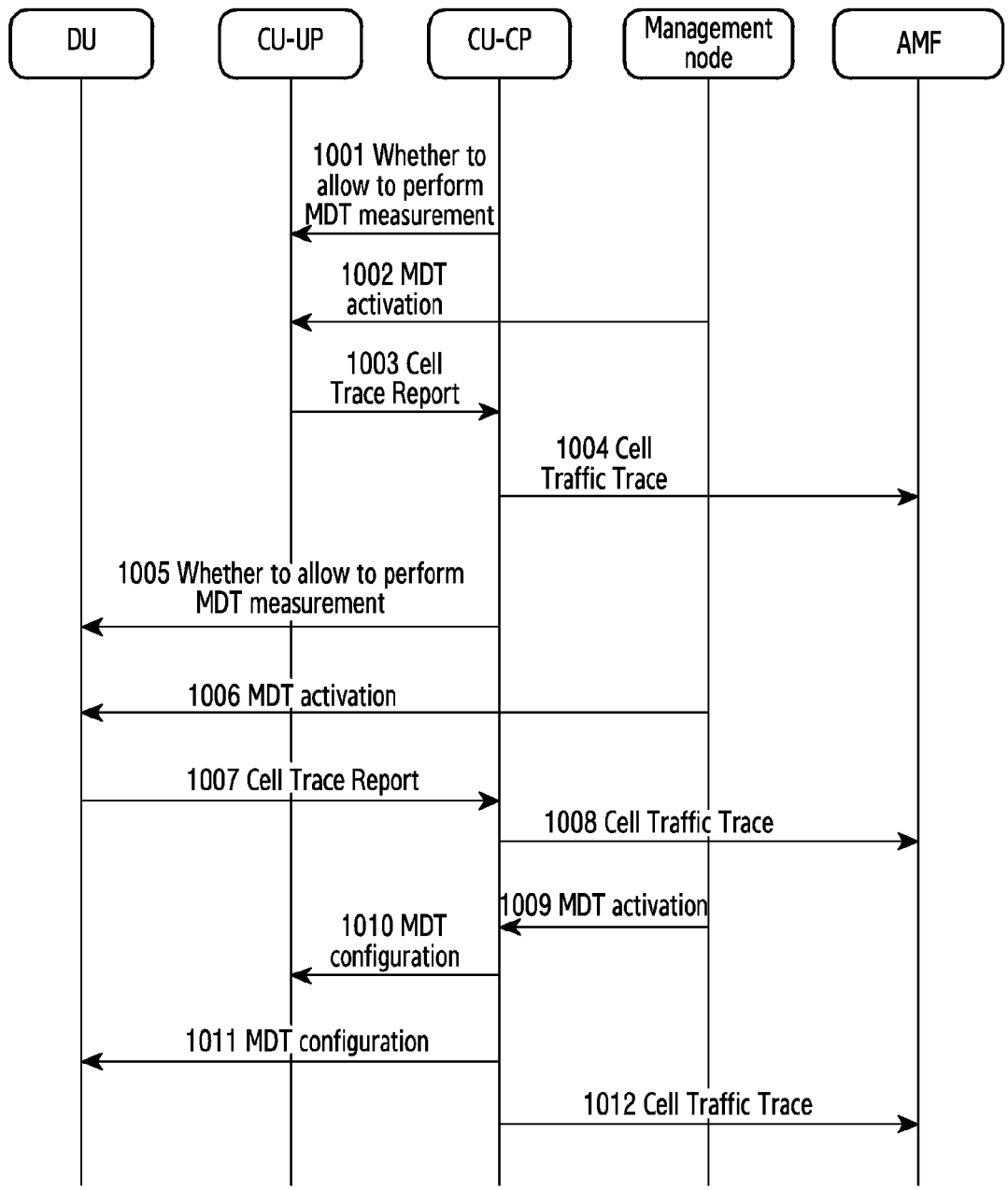

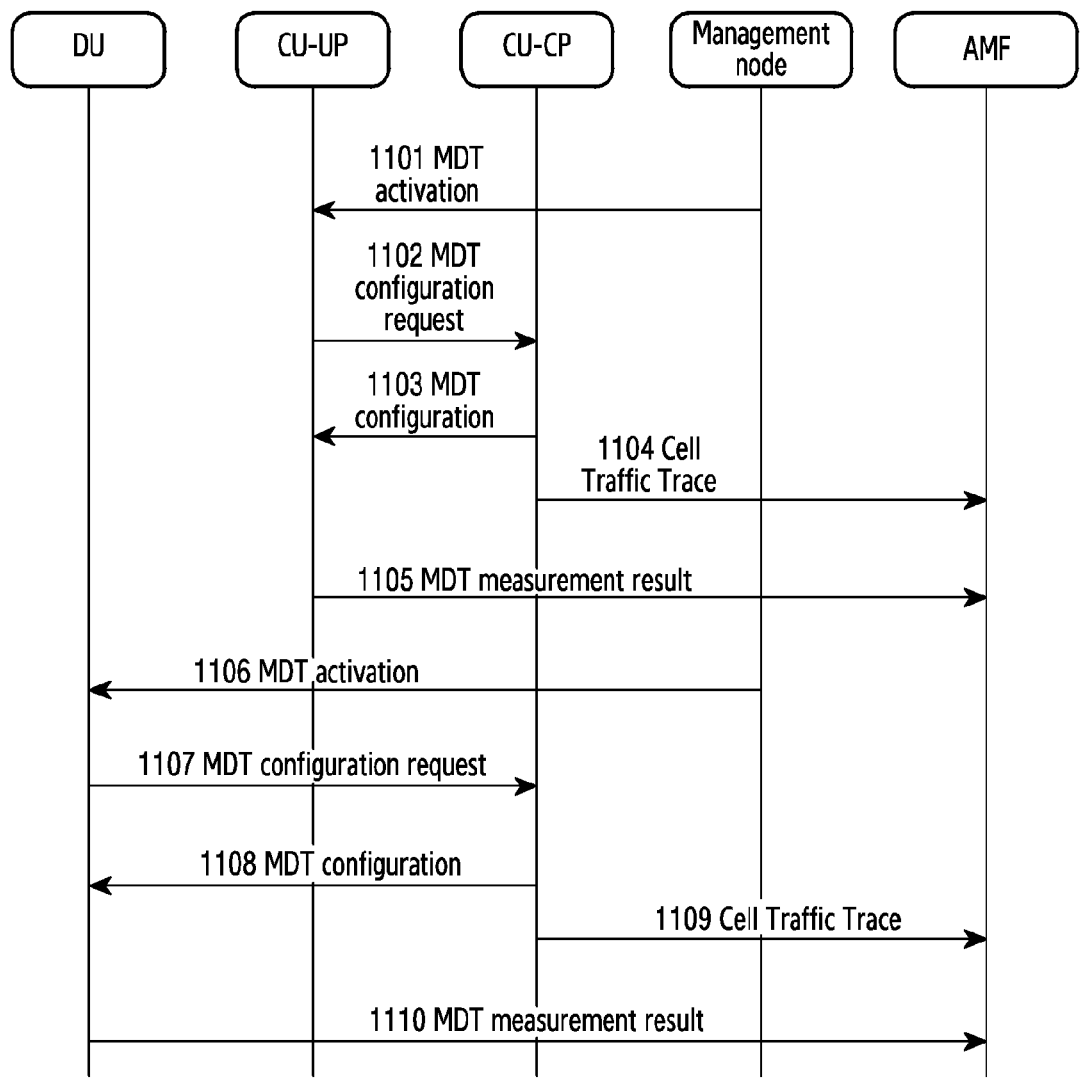
[Fig. 11]

APPARATUS AND A METHOD FOR CONFIGURATING AND REPORTING OF MINIMIZATION OF DRIVE TESTS MEASUREMENT AND ACCESS NETWORK DEVICE

TECHNICAL FIELD

The disclosure relates to wireless communication technologies, and in particular, to a configuration method, a reporting method of minimization of drive tests (MDT) measurement and an access network device.

BACKGROUND ART

To meet the demand for wireless data traffic having increased since deployment of $4^{th}$ to generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), nonorthogonal multiple access (NOMA), and sparse code multiple access (SCMA) as an advanced access technology have been developed.

5G refers to a fifth generation of mobile communication technology. Unlike the previous four generations, 5G is not a single wireless technology, but a convergence of existing wireless communication technologies. At present, a peak rate of LTE can reach 100 Mbps, and a peak rate of 5G will reach 10 Gbps, which is 100 times higher than that of 4G. The existing 4G network has limited spontaneous ability of network processing and cannot support some high-definition video, high-quality voice, augmented reality (AR), virtual reality (VR) and other services. 5G will introduce more advanced technologies to meet the growth of mobile traffic through higher spectrum efficiency, more spectrum resources and more dense cells, etc., to solve the problems faced by 4G network, and to build a network community with high-speed transmission rate, high-capacity, low-latency, high-reliability, and excellent user experience. As shown in FIG. 1, a 5G architecture includes a 5G access network and a 5G core network, and a user equipment (UE) communicates with a data network through the access network, the core network.

In the 5G architecture, with the development of wireless technologies, the functional modules that are originally on the same base station are separated, some functional modules are getting closer to a user, and other modules are pooled, virtualized, and centrally-deployed. That is, a base station may be divided into two parts, one part is a central unit (CU), and the other part is a distribute unit (DU). The DU is closer to a user, the CU is far away from an antenna, which can support multi-antenna connections and improve network performance. A CU can connect multiple DUs, and the functions on the CU can be virtualized. The CU and the DU are connected through an F1 interface, which is also called a fronthaul interface or a fronthaul connection. The functions of an RRC and a PDCP are implemented on the CU, and the functions of a RLC, a MAC, and a physical layer are implemented on the DU.

As shown in FIG. 1, the central unit (CU) may be further divided into a control function entity (hereinafter referred to as a CU-CP entity or a CP entity) and a user plane function entity (hereinafter referred to as a CU-UP entity or a UP entity). The CP entity and the UP entity may be separate physical entities, and an interface between the CP and the UP is referred to as an E1 interface. There is only a control plane between the CP and the UP, and a data plane is established between a core network, the UP and the DU. The CP is connected to the core network through a NG-C, and is connected to the DU through a F1-C, and the UP is connected to the core network through a NG-U, and is connected to the DU through a F1-U.

Minimization of drive tests (MDT) is to let a base station or a user perform some measurements and transmit the measurement results to a measurement center node, such as a trace collection entity (TCE) node, to reduce the burden of manual testing. MDT measurements need support both real-time and non-real-time measurements. A core network or an operation and maintenance node (such as Element Management, EM) transmit an MDT activation message to an access network node, and the message carries a specific MDT measurement configuration, such as a measurement type, a measurement cycle period, a measurement threshold, a reporting period, or a reporting threshold, etc. Some MDT measurement types require a UE to perform measurements. For these measurement types, the access network node transmits an RRC message to the UE, and configures the UE to perform MDT measurements, and the UE reports the measurement results to the access network node. Some MDT measurement types require a base station to perform measurements. For these measurement types, the base station performs MDT measurements based on specific configuration information. The access network transmits the measurement results, including the measurement results performed by the UE and the measurement results performed by the base station, to the measurement center node.

According to the way MDT initiates, MDT can be divided into a management-based MDT and a signaling-based MDT. The management-based MDT refers to: an access network entity receives an MDT activation message from the operation and maintenance node, and the signaling-based MDT refers to: an access network entity receives an MDT activation message from a core network entity, such as a mobility management entity.

FIG. 2 is a structure diagram of the management-based MDT. 201 refers to an operation and maintenance node (such as Element Management, EM). The operation and maintenance node 201 transmits an MDT activation request message to the access network node 202, and the access network node 202 may be an eNB of a 4G system, or a gNB or an eNB of a 5G system, or a base station in other systems. The MDT activation request message contains configuration information of the MDT. The configuration information of the MDT mainly contains: an MDT location selection condition, a reporting mechanism configuration, a trace reference (TR), an IP address of MDT measurement center node (such as a TCE), a work type, an MDT data anonymity and other information. The work type can be configured into different types, such as four types being currently defined: an immediate MDT only, a logged MDT only, a trace only, and an immediate MDT and trace. It is not excluded to define more types or simplify types. The MDT location selection condition configures that which locations of UEs can be selected as users of MDT measurements. The location selection condition may be configured as a range of cell, or a range of TAC, or an entire public land mobile network (PLMN). The UE in range may be selected as a UE that performs MDT measurements. The TR uniquely identifies an MDT process. In the MDT process, a base station may select multiple users to perform MDT measurements.

The access network node 202 selects a UE to perform MDT measurements. When the access network node selects the UE, certain conditions are to be followed, for example, whether the user agrees to perform measurements and/or whether the UE is located in the MDT location within the configuration information of the MDT. If the UE does not agree with the MDT, or the UE does not satisfy the location selection condition, the UE cannot be selected as a UE that performs MDT measurements. Selecting the UE, if the UE is required to perform measurements, the access network node transmits the configuration information of the MDT to the UE. The UE performs MDT measurements based on the configuration, and when reporting conditions are met, the UE transmits the measurement results to a network node access network node, and the access network node transmits an MDT tracking message to the core network entity 205. The core network entity may be a mobility management entity (MME) of 4G, an access and mobility management function (AMF) of 5G, or a core network entity connected to an access network in other systems. The message contains at least an identifier of the MDT and an IP address of the TCE. The core network entity 205 finds a unique identifier of the UE, such as an IMSI or an IMEI (SV), and transmits the unique identifier to the TCE. The access network node 202 stores measurement results of the MDT, also called MDT records, and transmits the MDT records to the TCE based on a predefined policy, and the TCE, in combination with the information transmitted by the core network entity, may know which UEs the MDT records are for.

The signaling-based MDT differs in that an MDT start message is transmitted from the core network entity to the access network entity, and the configuration information of the MDT is allocated by the core network entity.

The current protocol does not support: when the access network is multiple entities, for example, when the access network includes a DU, a CU-UP, and a CU-CP, the current MDT measurement mechanism does not involve how to configure multiple entities to perform MDT measurement, and which entity is responsible for MDT measurement, and which entity is responsible for reporting MDT measurement results.

DISCLOSURE OF INVENTION

Solution to Problem

The present application provides a method of how to perform a minimization of drive tests (MDT) measurement upon an access network containing multiple entities.

To achieve the above object, the present application adopts the following technical solutions:

The present application provides a configuration method of minimization of drive tests (MDT) measurement, comprising:

receiving, by a control node of an access network CU-CP, configuration information of the MDT from a core network or an operation and maintenance node;

configuring, by the control node of the access network, one or more access network nodes to perform the MDT.

Preferably, the configuration information comprises at least one of the following: an identifier of MDT measurement, a mode of measurement, and a reporting mechanism.

Preferably, the step of configuring, by the control node of the access network, one or more access network nodes to perform the MDT, comprises:

decomposing, by the control node of the access network, an MDT measurement mode into a plurality of different measurement modes and configuring them to different access network nodes to perform measurement respectively.

Preferably, the method further comprises:

receiving, by the control node of the access network, a result of the MDT measurement from a plurality of access network nodes, respectively;

transmitting, by the control node of the access network, the result of the MDT measurement to an MDT center node.

Preferably, the step of receiving, by the control node of the access network, a result of the MDT measurement from a plurality of access network nodes, respectively, comprises:

receiving, by the control node of the access network, the result of the measurement from the plurality of access network nodes respectively through a control plane, or receiving, by the control node of the access network, the result of the measurement from the plurality of access network nodes respectively through a user plane.

Preferably, after receiving, by the control node of the access network, a result of the MDT measurement from a plurality of access network nodes, respectively, the method further comprises:

forming, by the control node of the access network, a result of measurement by integrating received measurement result;

transmitting, by the control node of the access network, the result of the MDT measurement to the MDT center node, comprising: transmitting, by the control node of the access network, the result of measurement formed after the integrating to the MDT center node.

Preferably, the result of the MDT measurement includes: a name or an identifier of the node.

The present application provides a reporting method of minimization of drive tests (MDT) measurement, comprising:

receiving, by a second access network node, a result of MDT measurement from a first access network node; wherein, the result of MDT measurement is obtained by the first access network node performing the MDT measurement after receiving the information configured by a control node of an access network to perform the MDT;

transmitting, by the second access network node, the result of MDT measurement to an MDT center node.

Preferably, the second access network node is: a user plane of a central unit CU-UP or a distribute unit DU, and the first access network node is: a DU or a CU-UP.

Preferably, the step of receiving, by a second access network node, a result of MDT measurement from a first access network node, comprises:

receiving, by the second access network node, the result of measurement from the first access network node through a control plane, or receiving, by the second access network node, the result of measurement from the first access network node through a user plane.

Preferably, after receiving, by a second access network node, a result of MDT measurement from a first access network node, the method further comprises:
  forming, by the second access network node, a result of measurement by integrating received result of measurement;
  transmitting, by the second access network node, the result of MDT measurement to the MDT center node, comprising:
  transmitting, by the second access network node, the result of measurement formed after the integration to the MDT center node.

Preferably, the result of MDT measurement includes: a name or an identifier of the node.

The present application provides a reporting method of minimization of drive tests (MDT) measurement, comprising:
  receiving, by a first access network node, information configured by the access network control node to perform the MDT;
  performing, by the first access network node, the MDT measurement;
  transmitting, by the first access network node, a result of MDT measurement.

Preferably, the step of transmitting, by the first access network node, a result of the MDT measurement, comprises at least one of the following:
  transmitting, by the first access network node, the result of MDT measurement to an MDT center node;
  transmitting, by the first access network node, the result of MDT measurement to a second access network node, thereby integrating, by the second access network node, the received measurement result, and transmitting the integrated measurement result to an MDT center node;
  transmitting, by the first access network node, the result of MDT measurement to an access network control node, thereby integrating, by the access network control node, the received measurement result, and transmitting the integrated measurement result to a MDT center node.

Preferably, the second access network node is: a user plane of a central unit CU-UP or a distribute unit DU, and the first access network node is: a DU or a CU-UP.

Preferably, the result of MDT measurement includes: a name or an identifier of the node.

The present application provides a control node of an access network, comprises:
  a module, configured to receive configuration information of MDT from a core network or an operation and maintenance node;
  a module, configured to configure one or more access network nodes to perform the MDT.

The present application provides an access network node, comprising:
  a module configured to receive a result of MDT measurement from a first access network node; wherein, the result of MDT measurement is obtained by the first access network node performing the MDT measurement after receiving the information configured by a control node of an access network to perform the MDT;
  a module configured to transmit the result of MDT measurement to a MDT center node.

The present application provides an access network node, comprising:
  a module configured to receive information configured by a control node of an access network to perform MDT;
  a module configured to perform the MDT measurement;
  a module configured to transmit a result of the MDT measurement.

The present application provides a configuration method of minimization of drive tests (MDT) measurement, the method comprises:
  receiving, by a user node of an access network CU-UP, information about the user related to the MDT from a control node of an access network CU-CP;
  receiving, by the control node of the access network CU-CP, configuration information of the MDT from an operation and maintenance node;
  transmitting, by the user node of the access network CU-UP, a cell data tracking message to the control node of the access network CU-CP.

The information about the user related to the MDT includes at least one of the following: indication information about whether to allow the user to perform management-based MDT measurement, a list of public land mobile network (PLMN) identifiers that the UE can perform management-based MDT measurement.

The cell data tracking message carries identification information of the MDT, and the identification information of the MDT includes a combination of an identifier TR and a tracking record session identifier trace reference session reference (TRSR) of the MDT measurement, or an identifier that can uniquely indicate an MDT in the entire network.

The present application provides a configuration method of minimization of drive tests (MDT) measurement, comprising:
  receiving, by a distribute unit DU, information about the user related to the MDT from a control node of an access network CU-CP;
  receiving, by the distribute unit DU, configuration information of the MDT from an operation and maintenance node;
  transmitting, by the distribute unit DU, a cell data tracking message to the control node of the access network CU-CP.

The information about the user related to the MDT includes at least one of the following: indication information about whether to allow the user to perform management-based MDT measurement, a list of PLMN identifiers that the UE can perform management-based MDT measurement.

The cell data tracking message carries identifier information of the MDT, and the identifier information of the MDT includes a combination of an identifier TR and a tracking record session identifier TRSR of the MDT measurement, or an identifier that can uniquely indicate an MDT in the entire network.

The present provides a configuration method of minimization of drive tests (MDT) measurement, comprising:
  receiving, by a user node of an access network (CU-UP), a configuration information of the MDT from an operation and maintenance node;
  transmitting, by the CU-UP, the configuration information of MDT to a control node of an access network (CU-CP); and
  receiving, by the CU-UP, the configuration information of MDT for UE from the CU-CP Preferably, the CU-CP transmits a cell data tracking message to a core network, wherein, the cell data tracking message comprises an interface identifier of UE and an identifier information of MDT.

Preferably, the CU-CP selects a suitable user for measurement according to the configuration information of MDT.

The disclosure provides a configuration method of minimization of drive tests (MDT) measurement, comprising:

receiving, by a distribute unit (DU), a configuration information of the MDT from an operation and maintenance node;

transmitting, by the DU, the configuration information of MDT to a control node of an access network (CU-CP); and receiving, by the DU, the configuration information of MDT for UE from the CU-CP.

Preferably, the CU-CP transmits a cell data tracking message to a core network, wherein, the cell data tracking message comprises an interface identifier of UE and an identifier information of MDT.

Preferably, the CU-CP selects a suitable user for measurement according to the configuration information of MDT.

The present application provides an access network device, comprising a memory and a processor, and the memory is configured to store computer programs, and when the computer programs are executed by the processor, the steps of the foregoing method as claimed are implemented.

It can be seen from the foregoing technical solutions that the present application provides a method for performing measurement and reporting of MDT when the access network includes multiple entities.

BRIEF DESCRIPTION OF DRAWINGS

FIG. 1 is an architectural diagram of an existing 5G system;

FIG. 2 is a schematic structural diagram of an existing minimization of drive tests (MDT) measurement;

FIG. 3 illustrates a core network node in a wireless communication system according to an embodiment.

FIG. 4 is a schematic flowchart of Embodiment 1 of the present application;

FIG. 5 is a schematic flowchart of Embodiment 2 of the present application;

FIG. 6 is a schematic flowchart of Embodiment 3 of the present application;

FIG. 7 is a schematic flowchart of Embodiment 4 of the present application;

FIG. 8 is a schematic flowchart of Embodiment 5 of the present application;

FIG. 9 is a schematic diagram of a device of the present application;

FIG. 10 is a schematic flowchart of Embodiment 6 of the present application; and FIG. 11 is a schematic flowchart of Embodiment 7 of the present application.

BEST MODE FOR CARRYING OUT THE INVENTION

In order to make the objects, technical solutions and advantages of the present application clearer, the present application will be further described in detail below with reference to the accompanying drawings. It should be noted that the following description is for illustrative purposes only and is not intended to limit the disclosure. In the description below, a number of specific details are explained to provide better understanding of the present disclosure. However, it is apparent to those skilled in the art that the present disclosure can be implemented without these specific details. In other instances, well known circuits, materials, or methods are not described in detail so as not to obscure the concept of the present disclosure.

Throughout the specification, the reference to "one embodiment," "an embodiment," "one example" or "an example" means that specific features, structures or properties described in conjunction with the embodiment or example are included in at least one embodiment of the present disclosure. Therefore, the phrases "in one embodiment," "in an embodiment," "in one example" or "in an example" in various positions throughout the specification may not necessarily refer to the same embodiment or example. Furthermore, the specific features, structures or properties may be embodied in one or more embodiments or examples in any appropriate combination and/or subcombination. Moreover, it should be understood by those skilled in the art that the drawings provided herein are for the purpose of illustration, and the drawings are not necessarily to scale. As used herein, term "and/or" includes all or any of one or more associated listed items or combinations thereof.

FIG. 3 illustrates a core network node 205 in a wireless communication system according to an embodiment. The structure illustrated in FIG. 3 may be understood as a configuration of an apparatus having at least one function of SMF, AMF, PCF, and UDM. In the following description, it is understood that a term such as "module", "unit", "portion", "-or" or "-er" indicates a unit for processing at least one function or operation, and may be implemented using hardware, software, or a combination of hardware and software.

Referring to FIG. 3, the core network node 205 includes a communication unit 310 (e.g., communicator or communication interface), a storage unit 320 (e.g., storage), and a control unit 330 (e.g., at least one processor).

The communication unit 310 provides an interface for communicating with other devices in the network. For example, the communication unit 310 converts a bit string transmitted from the core network node 205 to another device into a physical signal, and converts a physical signal received from the other device into a bit string. That is, the communication unit 310 may transmit and receive a signal. Accordingly, the communication unit 310 may be referred to as a modem, a transmitter, a receiver, or a transceiver. At this time, the communication unit 310 allows the core network node 205 to communicate with other devices or systems via a backhaul connection (eg, wired backhaul or wireless backhaul) or over a network.

The storage unit 320 stores data such as a basic program which is for to operate the core network node 205, an application program, and setting information. The storage unit 320 may be configured as a volatile memory, a nonvolatile memory, or a combination of the volatile memory and the nonvolatile memory. In addition, the storage unit 320 provides stored data at the request of the controller 330.

The controller 330 controls overall operations of the core network node 205. For example, the controller 330 transmits and receives a signal through the communication unit 310. In addition, the controller 330 records and reads data in the storage 320. To this end, the controller 330 may include at least one processor. Also, the controller 330 may control the core network node 205 to perform operations according to various embodiments described below.

FIG. 4 describes a schematic diagram of a method of the present application. Embodiment 1:

In this embodiment, a process in which a core network node configures an access network to perform a minimization of drive tests (MDT) measurement is described. In this embodiment, the core network node may be a mobility management entity (MME) under an LTE system, or an access and mobility management function (AMF) under a 5G system, or a core network entity under other systems.

The access network node may be a central unit CU of a base station under a LTE system, or a control plane of a central unit CU (CU-CP) of a base station under a LTE system, or a central unit CU of a base station under a 5G system, or a control plane of a central unit CU (CU-CP) of a base station under a 5G system, or a control plane of a base station under other systems. FIG. 4 is an example of control plane of a central unit CU (CU-CP) of a base station under a 5G system. If it is another node, the corresponding interface and message also need to be modified accordingly. For example, under a 5G system, an interface between a core network node and an access network node is an NG interface, and under an LTE system, it is an S1 interface; under a 5G system, an interface between an access network node and an access network node is an Xn interface, and under an LTE system, it is an X2 interface.

Specifically, FIG. 4 may include the following steps:

Step 401: transmitting, by a core network node, UE related information to an access network node.

UE related information refers to MDT-related user information. Specifically, the MDT-related user information includes information indicating whether the user is allowed to perform MDT measurement, and/or information of a list of public land mobile network (PLMN) in which the UE is allowed to perform MDT measurement (hereinafter referred to as a list of MDT PLMN). Specifically, it can be transmitted by the following method:

1. Transmitting, by an initial context setup request message of the UE transmitted through a NG interface, the list of MDT PLMN and/or user consent information;

2. Transmitting, by a handover request message through a NG interface or a Xn interface, the list of MDT PLMN and the corresponding user consent information.

Step 402: transmitting, by the core network node, configuration information of the MDT to a control node of an access network, for example, a CU-CP.

In this step, the core network node can also be replaced with an operation and maintenance node, such as Element Management (EM).

The configuration information of the MDT contains one or more of the following information:

An identifier of MDT measurement that uniquely identifies one of the MDT measurement processes of the MDT.

An IP address of a measurement center node (for example, a TCE), which is an entity that receives the measurement report.

A mode of measurement, specifically refers to which measurement is performed, such as a measurement type can be a packet delay measurement, a packet loss rate measurement, or other modes.

A configuration of report, including information such as a report period, a report threshold and other information.

Area of measurement can be performed, which can be a group of cells, or a set of routing areas TA, or an entire PLMN range.

If the control node of the access network receives the message of step 402 from the core network (the message is for a certain UE), the core network has selected this UE to perform MDT measurement, and the control node of the access network configures the UE to perform measurement, and transmits the message of step 403.

If the control node of the access network receives the message of step 402 from the operation and maintenance node, the control node of the access network needs to select the UE to perform MDT measurement. When the control node of the access network selects the UE, the following factors should be considered: whether the user is allowed to perform MDT measurement, and whether the user is within the area where the MDT measurement is to be performed.

Step 403: transmitting, by the control node of the access network, for example, the CU-CP, configuration information of the MDT to the CU-UP.

This step can be omitted if the CU-CP and CU-UP are on one entity.

The CU-CP determines from which node the MDT measurement is performed based on the measurement configuration of step 402. There are several different implementations:

1. The CU-CP receives the MDT measurement mode in step 402, and further divides the MDT measurement into different measurement modes. Whether the access network is divided into different nodes, the core network is not clear at present. Therefore, when the core network configures the measurement, the measurement of the entire access network is configured, and the CU-CP further divides the MDT measurement into different measurements, and respectively requires the CU-UP and the DU to perform the measurement. For example, in step 402, a packet delay measurement is required, and the packet delay includes a delay on CU-UP, a delay on F1, and a delay on DU. Therefore, the CU-CP decides to divide the MDT measurement into three different measurement modes, which are measured by the CU-UP and the DU respectively, for example, the CU-UP measures the delay on CU-UP and F1 interface (the interface between the CU-UP and the DU), and the DU measures the delay on DU. The CU-CP transmits the message of step 403 to the CU-UP and the message of step 404 to the DU, respectively, and configures the CU-UP and the DU to perform measurement respectively.

2. The CU-CP receives the MDT measurement mode in step 402, and the CU-CP forwards the MDT measurement to the CU-UP and/or the DU, and the CU-UP and/or the DU performs the measurement. The CU-UP divides one MDT measurement into several MDT measurements, which are performed by different nodes. The CU-CP can configure the same MDT measurement identifier for different nodes, so that when one node combines measurements, the measurement results that can be combined will be found according to the same MDT measurement identifier. The CU-CP can configure different MDT measurement modes for different nodes. Or, the CU-CP configures different measurement identifiers for different nodes, so that the MDT measurement identifier sent by the core network and the MDT measurement identifier allocated by the CU-CP may be different. If the CU-CP allocates different MDT measurement identifiers, the best scheme is: the different node sends the measurement report to the CU-CP, which combines the measurement reports and sends the measurement results together with the MDT measurement identifier allocated by the core network to the MDT central node.

3. The core network node (or the operation and maintenance node) knows whether the access network is divided into different nodes, for example, when the NG interface is established, the access network transmits message to the core network node, and notifies the core network node that the access network is divided into different nodes, for example, are divided into CUs and DUs, or are divided into CU-CPs, CU-UPs, and DUs. The operation and maintenance node can know whether the access network is divided into different nodes through the configuration of operation and maintenance. When the core network node (or the operation and maintenance node) configures the MDT measurement, the corresponding MDT measurement can be configured according to whether the access network is divided. The CU-CP receives the MDT measurement mode in step 402, and transmits message to the corresponding node according to the measurement mode. For example, if the measurement mode is to measure the delay on CU-CP, the message of step 403 is transmitted to the CU-UP, and if the measurement mode is to measure the delay on DU, the message of step 404 is transmitted to the DU. MDT Measurements configuration information sent by the core network to CU-UP or DU include the same or different MDT measurement identifiers. The configuration information of the MDT contains one or more of the following information:

An identifier of MDT measurement that uniquely identifies one of the MDT measurement processes of the MDT.

An IP address of a measurement center node (for example, a TCE), which is an entity that receives the measurement report.

A mode of measurement, specifically refers to which measurement is performed. The measurement mode here can be the same as or different from the measurement mode included in step 402. For example, a measurement type may be a packet delay measurement, a delay measurement of CU-CP, a delay measurement of F1, and a delay measurement of DU, or other modes.

A configuration of report, including information such as a report period, a report threshold and other information.

Area of measurement can be performed, which can be a group of cells, or a set of routing areas TA, or an entire PLMN range.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node ID or an IP address of the measurement report.

A configuration information, indicating whether the measurement result is reported to the MDT central entity, the configuration information indicating whether the measurement result is reported by the access network node to the MDT central entity TCE, and the configuration information can also be indicated by an IP address of a measurement center node (for example, a TCE).

Step 404: transmitting, by the access network node, for example the CU-CP, configuration information of the MDT to another node, for example, the DU.

The configuration information of the MDT contains one or more of the following information:

An identifier of MDT measurement that uniquely identifies one of the MDT measurement processes of the MDT.

An IP address of a measurement center node (for example, a TCE), which is an entity that receives the measurement report.

A mode of measurement, specifically refers to which measurement is performed. The measurement mode here can be the same as or different from the measurement mode included in step 402. For example, a measurement type may be a packet delay measurement, a delay measurement of CU-CP, a delay measurement of F1, and a delay measurement of DU, or other modes.

A configuration of report, including information such as a report period, a report threshold and other information.

Area of measurement to be performed, which can be a group of cells, or a set of routing areas TA, or an entire PLMN range.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node ID or an IP address of the measurement report.

A configuration information, indicating whether the measurement result is reported to the MDT central entity, the configuration information indicating whether the measurement result is reported by the access network node to the MDT central entity TCE, and the configuration information can also be indicated by an IP address of a measurement center node (for example, a TCE).

The configuration process of the MDT ends.

In the manner of the foregoing Embodiment 1, the CU-UP and/or the DU perform the measurement of the MDT, and the measurement result can be reported to the MDT central entity by using Embodiment 2, or Embodiment 3, or Embodiment 4.

Embodiment 2

This embodiment describes that a control node of an access network transmits a measurement result to an MDT center node. The MDT measurement is performed by multiple access network nodes, and the multiple access network nodes report the measurement result to a control node of an access network, for example, a CU-CP, and the control node of the access network reports the measurement result to the MDT center node.

A core network node in this embodiment may be a mobility management entity MME under an LTE system, or an AMF under a 5G system, or a core network entity under other systems.

An access network node may be a central unit CU of a base station under an LTE system, or a control plane of a central unit CU (CU-CP) of a base station under an LTE system, or a central unit CU of a base station under a 5G system, or a control plane of a central unit CU (CU-CP) of a base station under a 5G system, or a control plane of a base station under other systems. FIG. 4 illustrates an example of a control plane of a central unit CU (CU-CP) of a base station and a distribution unit DU under a 5G system. If it is another node, the corresponding interface and message also need to be modified accordingly. For example, in a 5G system, an interface between a core network node and an access network node is an NG interface, and in an LTE system, it is an S1 interface. In a 5G system, an interface between an access network node and an access network node is a Xn interface, and in an LTE system, it is a X2 interface.

This embodiment is based on the process described in FIG. 5, and the method shown in FIG. 5 may comprise the following steps:

Step 501: transmitting, by an access network node, for example, a CU-CP, a message to a core network node, wherein the message carries an identifier of MDT measurement and an IP address of a measurement center node (for example, a TCE). The message of step 501 may be omitted in some cases, for example, if the core network configures the access network to perform MDT measurement, and the core network knows all the configuration information of the MDT, then the message of step 501 may be omitted.

Step 502: transmitting, by the core network node, a message to a measurement center node of the MDT, wherein the message carries information of an identifier of MDT measurement and information of an identifier of a UE, such as the IMSI or the IMEI (SV), to the MDT center node. The message of step 502 may be omitted in some cases, for example, if the core network configures the access network to perform MDT measurement, and the core network knows all the configuration information of the MDT, the message of step 502 may be omitted.

Step 503: transmitting, by a first access network node, a measurement result of the MDT to a control node of an access network, for example, a CU-CP.

The first access network node may be a DU, or a CU-UP. In this embodiment, the CU-UP is taken as an example. The CU-UP can report the measurement result of the MDT to the CU-CP through a message of a control plane. The measurement result of the MDT can be transmitted in the format of a container in the message. For example, in the Embodiment 1, the CU-UP is configured to perform the packet delay measurement on the CU-UP and the packet delay measurement on the F1 interface, and the CU-UP transmits the measurement result of the measured packet delay on the CU-UP and packet delay on the F1 interface to the CU-CP. Or, the CU-UP can report the MDT measurement result to the CU-CP through the user plane. The report of the measurement results contains the measurement results and the measurement identifier. When the CU-CP configures the MDT measurement for CU-UP, the CU-CP allocates a user plane information for reporting, such as an IP address and/or a tunnel identifier, and the CU-UP sends the measurement result to the CU-CP through the user plane.

Step 504: transmitting, by a second access network node, the measurement result of the MDT to the CU-CP.

The second access network node may be a DU, or a CU-UP. In this embodiment, the DU is taken as an example. The DU can report the measurement result of the MDT to the CU-CP through a message of a control plane. The measurement result of the MDT can be transmitted in the format of a container in the message. For example, in the Embodiment 1, the DU is configured to perform the packet delay measurement on the DU, and the DU transmits the measurement result of the measured packet delay on the DU to the CU-CP. Or, the CU-UP can report the measurement result to the CU-CP through the user plane. The report of the measurement results contains the MDT measurement results and the MDT measurement identifier. When the CU-CP configures the MDT measurement for DU, the CU-CP allocates a user plane information for reporting, such as an IP address and/or a tunnel identifier, and the DU sends the measurement result to the CU-CP through the user plane.

Step 505: transmitting, by the control node of the access network, for example, the CU-CP, the measurement result of the MDT to an MDT center node.

The control node of the access network, for example, the CU-CP, receives the measurement results of step 503 and step 504. According to different implementation manners, the CU-CP can directly forward the measurement results to the MDT center node, or the CU-CP sorts the measurement results of step 503 and step 504 into an appropriate format. For example, if a core network node or an operation and maintenance node require a packet delay measurement, the CU-CP determines that the packet delay on the CU-UP and on the F1 interface is measured by the CU-UP, and the packet delay on the DU is measured by the DU. In step 503 and step 504, the CU-CP receives the measurement results of the delay on the CU-UP (for example, including the measurement results of the delay on the UP and the delay on the F1) and the delay on the DU, respectively, and the CU-CP integrates the measurement results and forms a measurement result of the packet delay on the access network, and then transmits the measurement results to the MDT center node according to the configuration of the report. The CU-CP receives the measurement result sent by the DU and the CU-UP and the identifier of MDT measurement. If different measurement results have the same MDT measurement identifier, the CU-CP combines the measurement results of the same MDT measurement identifier into an appropriate format and sends it to the MDT central node. If the CU-CP divides the MDT measurement with the unique identifier configured by the core network or the OAM into several MDT measurements, and the related several MDT measurements have different MDT measurement identifiers, the CU-CP receives the measurement result and the corresponding MDT measurement identifier transmitted by the DU and the CU-UP, the CU-CP combines the relevant measurement results with different MDT measurement identifiers into an appropriate format, and then sends the measurement result together with the unique identifier configured by the core network (or the OAM) to the MDT center node.

The first reporting process of the measurement results ends.

Embodiment 3

This embodiment describes that an access network node transmits a result of measurement to an MDT center node. The MDT measurement is performed by multiple access network nodes, and one of the access network nodes, for example, a CU-UP, reports the result of measurement to the MDT center node.

In this embodiment, a core network node may be a mobility management entity MME under an LTE system, or an AMF under a 5G system, or a core network entity under other systems.

The access network node may be a central unit CU of a base station under a LTE system, or a control plane of a central unit CU (CU-CP) of a base station under a LTE system, or a central unit CU of a base station under a 5G system, or a control plane of a central unit CU (CU-CP) of a base station under a 5G system, or a control plane of a base station under other systems. FIG. 4 illustrates an example of a control plane of a central unit CU (CU-CP) of a base station under a 5G system. If it is another node, the corresponding interface and message also need to be modified accordingly. For example, in a 5G system, an interface between a core network node and an access network node is an NG interface, and in an LTE system, it is a S1 interface, and in a 5G system, an interface between an access network node and an access network node is an Xn interface, and in an LTE system, it is a X2 interface.

This embodiment is based on the process described in FIG. 6, and the method shown in FIG. 6 may comprise the following steps:

Step 601: transmitting, by a control node of an access network, for example, a CU-CP, a message to a core network node, wherein the message carries an identifier of MDT measurement and an IP address of a measurement center node (for example, a TCE). The message of step 601 may be omitted in some cases, for example, if the core network configures the access network to perform MDT measurement, and the core network knows all the configuration information of the MDT, the message of step 601 may be omitted.

Step 602: transmitting, by the core network node, a message to an MDT measurement center node, wherein the message carries information of an identifier of MDT measurement and information of an identifier of a UE, such as the IMSI or the IMEI (SV), to the MDT center node. The message of step 602 may be omitted in some cases, for example, if the core network configures the access network to perform MDT measurement, and the core network knows all the configuration information of the MDT, the message of step 602 may be omitted.

Step 603: transmitting, by a first access network node, a measurement result of the MDT to a second access network node.

The first access network node may be a DU, or a CU-UP. The second access network node may be a CU-UP or a DU. In this embodiment, the first access network node is a DU, and the second access network node is a CU-UP as an example, and it is also possible that the first access network node is a CU-UP, and second access network node is a DU, the situation is similar, except that the name of the node is simply replaced, so it is omitted here.

The DU can report the measurement result of the MDT to the CU-UP through a user plane, and the measurement result of the MDT can be transmitted in the format of a container of the user plane. The MDT measurement result may be sent by using a user plane corresponding to a bearer that has been established between the DU and the CU-UP. In this case, the MDT measurement result needs to be indicated in the user plane. Or, when the CU-CP configures the CU-UP and the DU to perform the MDT measurement, the CU-CP obtains the user plane information specifically allocated by the CU-UP for the MDT measurement reporting, such as the IP address and/or the tunnel identifier, and the CU-CP sends the obtained user plane information to the DU. The DU sends the MDT measurement result to the CU-UP through the user plane. (When a first node is CU-UP and a second node is DU, the method is similar, that is, when the CU-CP configures the CU-UP and the DU to perform MDT measurement, the CU-CP obtains the user plane information specifically allocated by the DU for the MDT measurement reporting, such as the IP address and/or the tunnel identifier, and the CU-CP sends the obtained user plane information to the CU-UP. The CU-UP sends the MDT measurement result to the DU through the user plane.) Or the DU can report the measurement result of the MDT to the CU-UP through a message of a control plane, and the measurement result of the MDT can be transmitted in the format of a container in the message. The information that the DU sends to the CU-UP contains the measurement result and the identifier of MDT measurement.

Step 604: transmitting, by the second access network node, a measurement result of the MDT to an MDT center node.

The second access network node, for example, a CU-UP (or a DU), receives the measurement result of step 603. According to different implementation manners, the CU-UP can directly forward the measurement result to the MDT center node, or the second access network node combines the measurement result of step 603 with the measurement result of the second access network node its own, and organizes them into an appropriate format, for example, if a core network node or an operation and maintenance node requires a packet delay measurement of a RAN, the CU-CP configures the CU-UP to measure a packet delay on the CU-UP and a packet delay on the F1 interface, and configures the DU to measure a packet delay on the DU, the process of configuration is described in Embodiment 1. In step 603, the CU-UP receives the measurement result of the delay on the DU transmitted by the DU, and the CU-UP also performs the delay measurement on the UP and the F1, and the CU-UP combines the measurement result of its own and the measurement result of the delay on the DU, and integrates the measurement results, forms the measurement results of the delay on the access network, and then, according to the MDT reporting configuration, configures the measurement results to be transmitted to the MDT center node. The CU-UP receives the measurement result sent by the DU and the identifier of MDT measurement. If other measurement results have the same MDT measurement identifier, the CU-UP combines the measurement results of the same MDT measurement identifier into an appropriate format and sends it to the MDT central node. Or, the CU-UP receives the measurement result sent by the DU and the identifier of MDT measurement, combines the related measurement results into an appropriate format, and sends it to the MDT central node.

The second reporting process of the measurement results ends.

Embodiment 4

This embodiment describes that an access network node transmits a measurement result to an MDT center node. The MDT measurement is performed by different access network nodes, for example, a CU-UP and a DU, and the measurement result of the MDT is respectively transmitted to an MDT central entity, such as a TCE.

A core network node in this embodiment may be a mobility management entity MME under an LTE system, or an AMF under a 5G system, or a core network entity under other systems.

The access network node may be a central unit CU of a base station under an LTE system, or a control plane of a central unit CU (CU-CP) of a base station under an LTE system, or a central unit CU of a base station under a 5G system, or a control plane of a central unit CU (CU-CP) of a base station under a 5G system, or a control plane of a base station under other systems. FIG. 4 illustrates an example of a control plane of a central unit CU (CU-CP) of a base station under a 5G system. If it is another node, the corresponding interface and message also need to be modified accordingly. For example, in a 5G system, an interface between a core network node and of an access network node is an NG interface, and in an LTE system, it is a S1 interface. In a 5G system, an interface between an access network node and an access network node is a Xn interface, and in an LTE system, it is a X2 interface. This embodiment is based on the process described in FIG. 7, and the method shown in FIG. 7 may comprise the following steps:

Step 701: transmitting, by a control node of an access network, for example, a CU-CP, a message to a core network node, wherein the message carries an identifier of MDT measurement and an IP address of a measurement center node (for example, a TCE). The message of step 701 may be omitted in some cases, for example, if the core network configures the access network to perform MDT measurement, and the core network knows all the configuration information of the MDT, the message of step 701 may be omitted.

Step 702: transmitting, by the core network node, a message to an MDT measurement center node, wherein the message carries information of an identifier of MDT measurement and information of an identifier of a UE, such as the IMSI or the IMEI (SV), to the MDT center node. The message of step 701 may be omitted in some cases, for example, if the core network configures the access network to perform the MDT measurement, and the core network knows all the configuration information of the MDT, the message of step 701 may be omitted.

Step 703: transmitting, by an access network node, such as a CU-UP or a DU, a measurement result of the MDT to an MDT center node.

In the configuration process of the MDT, as shown in Embodiment 1, the CU-UP or the DU obtains the IP address of the MDT center node, and the CU-UP or the DU performs measurement according to the configuration, and reports the measurement result to the MDT center node according to the configuration of the reporting. The measurement result includes an identifier of the MDT measurement, a mode of the MDT, and a name of the node (it can be set to a CU-CP, a CU-UP, a DU, or a base station), measurement results of the MDT mode, such as a packet delay, or a packet loss, etc. The MDT central node receives the measurement result and the corresponding MDT measurement identifier, and combines the measurement results corresponding to the same MDT measurement identifier into an appropriate format. If the MDT measurement identifiers are different, other information according to the measurement configuration, such as the measurement mode, may be sent to the MDT center along with the measurement results, and the MDT center node performs the combination of the measurement results.

Step 704: transmitting, by another access network node, such as a DU or a CU-UP, a measurement result of the MDT to an MDT center node. If only one access network node performs the MDT measurement, the message of step 704 is naturally omitted.

In the configuration process of the MDT, as shown in Embodiment 1, the DU or the CU-UP obtains the IP address of the MDT center node, and the DU performs measurement according to the configuration, and reports the measurement result to the MDT center node according to the configuration of the reporting. The measurement result includes an identifier of the MDT measurement, a mode of the MDT, a name of the node (it can be set to a CU-CP, a CU-UP, a DU, or a base station), measurement results of the MDT mode, such as a packet delay, or a packet loss, etc.

The third reporting process of the measurement results ends.

Embodiment 5

This embodiment describes a method of measuring a delay of a downlink data by a DU. The method describes that a CU-CP configures a CU-UP and a DU to perform the measurement of the delay of the downlink data. This embodiment is based on the process described in FIG. 8, and the method shown in FIG. 8 may comprise the following steps:

Step 801: transmitting, by a CU-UP, a data packet to a DU, wherein the data packet includes a timestamp corresponding to the data packet. According to a definition of packet delay, the timestamp indicates the time when the delay calculation starts. For example, the timestamp indicates the time when the CU-UP receives the data packet from a NG interface, or indicates the time when a SDAP receives the data packet, or indicates the time when a PDCP receives the data packet.

The CU-UP receives the configuration information of the MDT measurement. The configuration of the MDT is described in Embodiment 1. The CU-UP receives the configuration information of the MDT from the CU-CP, and the CU-UP knows a mode, a period of the report, and a threshold of the report to be measured, for example, the mode of the measurement is a packet delay. When the CU-UP transmits the data packet to the DU, the timestamp corresponding to the data packet is also transmitted to the DU.

Step 802: measuring, by the DU, a transmission delay of the data packet on an access network.

The DU also receives the configuration information of the MDT measurement. The configuration of the MDT is described in Embodiment 1. The DU receives the configuration information of the MDT from the CU-CP, and the DU know a mode, a period of the report, and a threshold of the report to be measured, for example, the mode of the measurement is a packet delay. The DU receives the data packet and a corresponding timestamp, and the DU can calculate a transmission delay of the data packet on the access network, for example, the transmission delay refers to a time difference from the time when a PDCP receives the data packet to the time when a UE receives the data packet. The DU can calculate the data delay of the access network by measuring all the data packets for a period of the time. Then, the DU can directly transmit the measurement result to an MDT central entity through the method described in Embodiment 1 or Embodiment 2 or Embodiment 4, or the DU transmits the measurement result to an MDT central entity through the CU-UP or the CU-CP.

The method can also be used for measurement of other MDT modes, and is not intended to be limited to the packet delay only. Any modifications, equivalent replacements, improvements, etc., made within the spirit and principles of the present application should be included within the scope of the present application.

FIG. 4 illustrates a process in which the core network configures a NG-RAN to perform MDT measurement, and FIG. 10 is Embodiment 6 of the present application, which describes a process of performing MDT measurement by configuring a UE by a management node belonging to an operation and maintenance node, and the MDT measurement configured by the operation and maintenance node is referred to as a management-based MDT measurement. In the case of separating the RAN, there are three different configuration methods.

The first method is that a management node belonging to an operation and maintenance node directly configures the CU-UP to perform MDT measurement, and the first method is described in steps 1001 to 1004. The second method is that a management node directly configures the DU to perform MDT measurement, and the second method is described in steps 1005 to 1008. Depending on the different measurement modes or the different measurement types, the first method or the second method can be selected to activate the MDT measurement. For example, for measuring the packet delay on the CU-UP, the management node can directly configure the CU-UP to perform measurement, and for measuring the packet delay on the DU, the management node can directly configure the DU to perform measurement. The third method is that a management node configures the CU-CP to perform MDT measurement, and the CU-CP selects a user that satisfies the condition, and decides whether to transmit the measurement configuration to the CU-CP or the DU or both. The third method is described in steps 1009 to 1012. The three methods are specifically described below.

Step 1001: transmitting, by the CU-CP, information about whether to allow the UE to perform MDT measurement to the CU-UP.

The CU-CP obtains information about the user and the MDT from a core network, and the information related to the MDT includes indication information about whether to allow the user to perform management-based MDT measurement, and/or a list of PLMN identifiers that the UE can perform management-based MDT measurement. As shown in step 401, the CU-CP transmits the information about the user and the MDT, that is, the indication information about whether to allow the user to perform management-based MDT measurement, and/or a list of PLMN identifiers (hereinafter referred to as a list of MDT PLMNs) that the UE can perform management-based MDT measurement, to the CU-UP through a E1 interface. The information may carry the above information through a message carrying a context establishment request of the E1 interface, or other UE-related messages. The message carrying the context establishment request or other messages contains one or more of the following information:

An identifier of the UE on the E1 interface includes at least an identifier assigned by the CU-CP to the UE on the E1 interface.

An identifier of the serving PLMN of the UE, the identifier of the serving PLMN of the UE is an identifier of the operator selected by the CU-UP or the UE, and the CU-CP holds the identifier of the serving PLMN of the UE and transmits it to the CU-UP.

An identifier of the cell in which the UE is located includes, for example, an identifier CGI unique to the entire network of the cell where the UE is located, or an identifier PCI of the physical layer of the cell where the UE is located, and a frequency of the cell.

An information of the routing area where the UE is located, such as an identifier TAI of the routing area, or a code TAC of the routing area.

An information indicating whether the UE is allowed to perform management-based MDT measurement, the information indicating that the UE allows management-based MDT measurement, and the node receiving the information may select the UE to perform management-based MDT measurement. In the system indicated by these identifiers PLMNs, a list of MDT PLMNs that can be used for MDT measurement can perform MDT measurement.

Step 1002: transmitting, by a management node, an MDT activation message to the CU-UP.

When the management node needs to activate the MDT measurement, these MDT measurements need to be performed on the CU-UP, and the management node transmits an MDT activation message to the CU-UP. The MDT activation message contains a configuration information of the MDT. The configuration information of the MDT contains one or more of the following information:

An identifier of the UE on the E1 interface, includes an identifier assigned by the CU-CP to the UE on the E1 interface, and/or an identifier assigned by the CU-UP to the UE on the E1 interface.

An identifier of the MDT measurement (for example, a trace reference, referred to as a TR), which is a unique identifier of the entire network, including an identity of the PLMN and an ID. It identifies an MDT measurement of the MDT.

An IP address of a measurement center node (for example, a TCE), which is an entity that receives the measurement report.

A mode of measurement, or a type of measurement, specifically refers to which measurement is performed. For example, the type of measurement may be a packet delay measurement, a delay measurement of F1, and a delay measurement of CU-UP.

A configuration of report, including information such as a report period, a report threshold and other information.

A range of measurement, which can be a group of cells, i.e., containing a list of cell identities; or a list of routing area identities, such as a TAI list or a TAC list, or an entire PLMN range.

A privacy indication information, also an anonymous indication information, indicating that the core network does not need to transmit the IMSI/IMEI of the UE to the TCE node, but does not transmit the IMSI of the UE to the TCE, or transmits the IMEI-TAC to the TCE.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node identifier of the measurement report or an IP address and/or a tunnel identifier of a destination node of the measurement report.

A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1003: transmitting, by the CU-UP, a message to the CU-CP, wherein the message carries the identification information of the MDT.

The CU-UP selects an appropriate user to perform MDT measurement according to the configuration of the MDT measurement received in step 1002. First, the user wants to allow management-based MDT measurement, i.e., in the message of step 1001, the CU-UP receives the indication information that the UE allows for management-based MDT measurement, the serving PLMN of the UE is in the list of MDT PLMNs, and the location where the UE is located needs to be within the range of the MDT measurement, for example, the range of the MDT measurement is a group of cells, and the serving cell of the UE received in step 1001 belongs to a certain cell in the group of cells. The CU-UP selects the user that meets the condition to perform MDT measurement, and the CU-UP can assign an identifier to the selected UE, such as a trace reference session reference (TRSR). The identifier and the identifier of the MDT measurement (for example, a TR), and the combination of the two identifiers or the partial identifiers that respectively intercept the two identifiers is referred to as the identifier of the MDT of the access network. Of course, an MDT identifier may be additionally generated as long as the identifier can uniquely indicate an MDT measurement on the entire network.

The message transmitted by the CU-UP to the CU-CP may be a cell traffic trace or other messages. The message carries one or more of the following information:

The message carries an identifier of the MDT of the access network. As described above, the identifier of the MDT of the access network may be a combination of the TR and the TRSR, or an identifier capable of uniquely indicating an MDT on the entire network.

The message also carries an IP address of the measurement center node (such as a TCE).

The message also carries an identifier of the cell, indicating the identifier of the cell in which the UE is located.

The message also carries a privacy indication information indicating that the AMF needs to transmit the IMEI-TAC to the TCE.

Step 1004: transmitting, by the CU-CP, a message to a core network AMF, wherein the message carries identification information of the MDT.

The CU-CP transmits the message received in step 1003 to the core network AMF, the content of the message is shown in step 1003, the CU-CP only need to change the UE identifier in E1 interface into the UE identifier in NG interface, that is UE identifier in NG interface includes an identifier assigned by the CU-CP to the UE on the NG interface, and/or an identifier assigned by the AMF to the UE on the NG interface. After receiving the message, the core network AMF transmits the identifier of the MDT received, such as a TR, a TRSR, and the identifier of the UE received, such as the IMSI, the IMEI, or the IMEI-TAC, to the TCE node.

The following is a description of second method.

Step 1005: transmitting, by the CU-UP, information about whether to allow the UE to perform MDT measurement to the DU.

The CU-CP obtains information about the user and the MDT from a core network, and the information related to the MDT includes indication information about whether to allow the user to perform management-based MDT measurement, and/or a list of PLMN identifiers that the UE can perform management-based MDT measurement. As shown in step 401, the CU-CP transmits the information about the user and the MDT, that is, the indication information about whether to allow the user to perform management-based MDT measurement, and/or a list of PLMN identifiers (hereinafter referred to as a list of MDT PLMNs) that the UE can perform management-based MDT measurement, to the DU through a F1 interface. The foregoing information may be carried by a setup request message carried on the F1, or a context setup request message of the UE, or a transport message of a downlink RRC, or may be carried by other UE related messages. The message contains one or more of the following:

An identifier of the UE on the F1 interface including at least an identifier assigned by the CU-CP to the UE on the F1 interface.

An identifier of the serving PLMN of the UE, the identifier of the serving PLMN of the UE is an identifier of the operator selected by the CU-CP or the UE, and the CU-CP holds the identifier of the serving PLMN of the UE and transmits it to the DU.

An identifier of the cell in which the UE is located, for example, including an identifier CGI unique to the entire network of the cell where the UE is located, or an identifier PCI of the physical layer of the cell and a frequency of the cell where the UE is located.

An information of the routing area where the UE is located, such as an identifier TAI of the routing area, or a code TAC of the routing area.

An information indicating whether the UE is allowed to perform management-based MDT measurement, the information indicating that the UE allows management-based MDT measurement, and the node receiving the information may select the UE to perform management-based MDT measurement.

In the system indicated by these identifiers PLMNs, a list of MDT PLMNs that can be used for MDT measurement can perform MDT measurement.

Step 1006: transmitting, by a management node, an MDT activation message to the DU.

When the management node needs to activate the MDT measurement, these MDT measurements need to be performed on the DU, and the management node transmits an MDT activation message to the DU. The MDT activation message contains a configuration information of the MDT, and the configuration information of the MDT contains one or more of the following information:

An identifier of the MDT measurement, such as a trace reference, referred to as a TR. The identifier is a unique identifier for the entire network, including an identity of the PLMN and an ID. The identifier identifies an MDT measurement of the MDT.

An IP address of a measurement center node (for example, a TCE). The measurement center node is an entity that receives the measurement report.

A mode of measurement, or a type of measurement, specifically refers to which measurement is performed. For example, the measurement type may be a packet delay measurement, a delay measurement of F1, and a delay measurement of DU.

A configuration of report, including information such as a report period, a report threshold and other information.

A range of measurement, which can be a group of cells, i.e., containing a list of cell identities; or a list of routing area identities, such as a TAI list or a TAC list, or an entire PLMN range.

A privacy indication information, also an anonymous indication information, indicating that the core network does not need to transmit the IMSI/IMEI of the UE to the TCE node, but does not transmit the IMSI of the UE to the TCE, or transmits the IMEI-TAC to the TCE.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node identifier of the measurement report or an IP address and/or a tunnel identifier of a destination node of the measurement report.

A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1007: transmitting, by the DU, a message to the CU-CP, wherein the message carries identification information of the MDT.

The DU selects an appropriate user to perform the MDT measurement based on the configuration of the MDT measurement received in step 1006. First, the user wants to allow management-based MDT measurement, i.e., in the message of step 1005, the DU receives the indication information that the UE allows for management-based MDT measurement, and secondly, the serving PLMN of the UE is in the list of MDT PLMNs, and the location where the UE is located needs to be within the range of the MDT measurement, for example, the range of the MDT measurement is a group of cells, and the serving cell of the UE received in step 1005 belongs to a certain cell in this group of cells. The DU selects the user who meets the condition to perform the MDT measurement, and the DU can assign an identifier to the selected UE, such as a trace reference session reference (TRSR). The identifier and the identifier of the MDT measurement (for example, a TR), i.e., the two identifiers, or the partial identifiers of the two identifiers are respectively intercepted, are combined to form an identifier of the MDT of the access network. Of course, an MDT identifier may be additionally generated as long as the identifier can uniquely indicate an MDT measurement on the entire network.

The message that the DU transmits to the CU-CP may be a cell traffic trace or other messages. The message carries one or more of the following information:

An identifier of the UE on the F1 interface, includes an identifier assigned by the CU-CP to the UE on the F1 interface, and/or an identifier assigned by the DU to the UE on the F1 interface.

The message carries an identifier of the MDT of the access network. As described above, the identifier of the MDT of the access network may be a combination of the TR and the TRSR, or an identifier capable of uniquely indicating an MDT on the entire network.

The message further carries an IP address of the measurement center node (such as a TCE).

The message further carries an identifier of the cell, indicating the identifier of the cell in which the UE is located.

The message further carries a privacy indication information indicating that the AMF needs to transmit the IMEI-TAC to the TCE.

Step 1008: transmitting, by the CU-CP, a message to the core network AMF, wherein the message carries the identifier information of the MDT.

The CU-CP transmits the message received in step 1007 to the core network AMF. The content of the message is shown in step 1007, the CU-CP only need to change the UE identifier in F1 interface into the UE identifier in NG interface, that is UE identifier in NG interface includes an identifier assigned by the CU-CP to the UE on the NG interface, and/or an identifier assigned by the AMF to the UE on the NG interface. After receiving the message, the core network AMF transmits the identifier of the MDT received, such as the TR, the TRSR, the identifier of the UE received, such as the IMSI, the IMEI, or the IMEI-TAC, to the TCE node.

The following is a description of third method.

Step 1009: transmitting, by a management node, an MDT activation message to the CU-CP.

The MDT activation message contains a configuration information of the MDT. The configuration information of the MDT contains one or more of the following information:

An identifier of the MDT measurement (for example, a trace reference, referred to as a TR). The identifier is a unique identifier of the entire network, including an identity of the PLMN and an ID. The identifier identifies a certain MDT measurement of the MDT.

An IP address of a measurement center node (for example, a TCE), and the measurement center node is an entity that receives the measurement report.

A mode of measurement, or a type of measurement, specifically refers to which measurement is performed. For example, the type of measurement may be a packet delay measurement, a delay measurement of F1, and a delay measurement of DU.

A configuration of report, including information such as a report period, a report threshold and other information.

A range of measurement, which can be a group of cells, i.e., containing a list of cell identities; or a list of routing area identities, such as a TAI list or a TAC list, or an entire PLMN range.

A privacy indication information, also an anonymous indication information, indicating that the core network does not need to transmit the IMSI/IMEI of the UE to the TCE node, but does not transmit the IMSI of the UE to the TCE, or transmits the IMEI-TAC to the TCE.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node identifier of the measurement report or an IP address and/or a tunnel identifier of a destination node of the measurement report.

A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1010: transmitting, by the CU-CP, a measurement configuration to the CU-UP.

The CU-CP selects an appropriate user to perform the MDT measurement based on the configuration of the MDT measurement received in step 1009. First, the user wants to allow management-based MDT measurement, and the CU-CP receives from the core network indication information that the UE agrees to perform management-based MDT measurement. Secondly, the location of the UE needs to be within the range of the MDT measurement, and the CU-CP can assign an identifier to the selected UE, such as a trace reference session reference (TRSR), the identifier of the identifier of the MDT measurement (for example, a TR), i.e., the two identifiers, or the partial identifiers of the two identifiers are respectively intercepted, are combined to form the identifier of the MDT of the access network. Of course, an MDT identifier may be additionally generated as long as the identifier can uniquely indicate an MDT measurement on the entire network.

The CU-CP determines whether the MDT measurement is measured by the CU-UP or by the DU. If measured by the CU-UP, the CU-CP transmits the message of step 1010 to the CU-UP, and the message carries configuration information of the MDT. The configuration information of the MDT is similar to that of step 1009 and is omitted here. If measured by the DU, the CU-CP transmits the message of step 1011 to the DU, and the message carries configuration information of the MDT. The CU-CP may transmit information carrying a setup message and carrying an MDT configuration the CU-UP, or a newly defined MDT activation message to the CU-UP, and the MDT activation message or other message of the step 1010 includes one or more of the following information:

An identifier of the UE on the E1 interface, including at least an identifier assigned by the CU-CP to the UE on the E1 interface.

An identifier of the MDT, such as a combination of TRSR and TR.

An IP address of a measurement center node (for example, a TCE), and the measurement center node is an entity that receives the measurement report.

A mode of measurement, a type of measurement, specifically refers to which measurement is performed. For example, the measurement type may be a packet delay measurement, a delay measurement of F1, and a delay measurement of DU.

A configuration of report, including information such as a report period, a report threshold and other information.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is determined by setting an identifier or an IP address of a destination node of the measurement report.

A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1011: transmitting, by the CU-CP, a measurement configuration to the DU.

As shown in step 1010, if the CU-CP determines that the MDT measurement is measured by the DU, the CU-CP transmits the message of step 1011 to the DU, and the message carries configuration information of the MDT. The message may be a UE context setup message or a UE context modification message, or a newly defined message, and the message carries an identifier of the UE on the F1 interface and configuration information of the MDT. The configuration information of the MDT is similar to the information shown in step 1010, and is omitted here.

Step 1012: transmitting, by the CU-CP, a message to the AMF, wherein the message carries an identifier information of the MDT.

The message transmitted by the CU-CP to the AMF may be a cell traffic trace or other messages. The message carries one or more of the following information:

The message carries an identifier of the MDT. As described above, the identifier of the MDT in the access network may be a combination of the TR and the TRSR, or an identifier capable of uniquely indicating an MDT on the entire network.

The message further carries an IP address of the measurement center node (such as a TCE).

The message further carries an identifier of the cell, indicating an identifier of the cell in which the UE is located.

The message further carries a privacy indication information indicating that the AMF needs to transmit the IMEI-TAC to the TCE.

After receiving the message, the core network AMF transmits the received identifier of the MDT, such as the TR, the TRSR, the received identifier of the UE, such as the IMSI, the IMEI, or the IMEI-TAC, to the TCE node.

FIG. 11 is Embodiment 7 of the disclosure, which describes a process of performing MDT measurement by configuring a UE by a management node belonging to an operation and maintenance node, and the MDT measurement configured by the operation and maintenance node is referred to as a management-based MDT measurement. In the case of separating the RAN, there are three different configuration scenes.

The first scene is that a management node belonging to an operation and maintenance node directly configures the CU-UP to perform MDT measurement, and the first scene is described in steps 1101 to 1104. The second method is that a management node directly configures the DU to perform MDT measurement, and the second method is described in steps 1105 to 1108. Depending on the different measurement modes or the different measurement types, the first scene or the second scene can be selected to activate the MDT measurement. For example, for measuring the packet delay on the CU-UP, the management node can directly configure the CU-UP to perform measurement, and for measuring the packet delay on the DU, the management node can directly configure the DU to perform measurement. Another scene is that a management node configures the CU-CP to perform MDT measurement, and the CU-CP selects a user that satisfies the condition, and decides whether to transmit the measurement configuration to the CU-CP or the DU or both. The scene is described in previous embodiments, which will be omitted. The two scenes are specifically described below.

Step 1101: transmitting, by a management node, an MDT activation message to the CU-UP.

When the management node needs to activate the MDT measurement, these MDT measurements need to be performed on the CU-UP, and the management node transmits an MDT activation message to the CU-UP. The MDT activation message contains a configuration information of the MDT. The configuration information of the MDT contains one or more of the following information:

An identifier of the MDT measurement (for example, a trace reference, referred to as a TR), which is a unique identifier of the entire network, including an identity of the PLMN and an ID. It identifies an MDT measurement of the MDT.

An IP address of a measurement center node (for example, a TCE), which is an entity that receives the measurement report.

A mode of measurement, or a type of measurement, specifically refers to which measurement is performed. For example, the type of measurement may be a packet delay measurement, a delay measurement of F1, and a delay measurement of CU-UP.

A configuration of report, including information such as a report period, a report threshold and other information.

A range of measurement, which can be a group of cells, i.e., containing a list of cell identities; or a list of routing area identities, such as a TAI list or a TAC list, or an entire PLMN range.

A privacy indication information, also an anonymous indication information, indicating that the core network does not need to transmit the IMSI/IMEI of the UE to the TCE node, but does not transmit the IMSI of the UE to the TCE, or transmits the IMEI-TAC to the TCE.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node identifier of the measurement report or an IP address and/or a tunnel identifier of a destination node of the measurement report.

A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1102: transmitting, by the CU-UP, a configuration request of MDT message to the CU-CP, wherein the message carries the identification information of the MDT.

The CU-UP transmits a configuration request of MDT message to the CU-CP according to the configuration of the MDT measurement received in step 1101. The purpose of message is which UEs CU-CP selects for performing MDT measurement. The message is a public message, not a dedicated message for UE. The CU-UP delays a messaged received in step 1101 to the CU-CP through the message.

Step 1103: selecting, by the CU-CP, a suitable user to perform the MDT measurement, and transmitting the MDT configuration message to the CU-UP.

A message in step 1103 is a dedicated message for UE. The CU-CP selects a suitable user for performing the MDT measurement. First, the user wants to allow management-based MDT measurement, i.e., in the previous process, the CU-UP receives the indication information that the UE allows for management-based MDT measurement transmitted from the core network and/or a list of MDT PLMNs of UE. If the current serving PLMN of the UE is in the list of MDT PLMNs, and the location where the UE is located needs to be within the range of the MDT measurement, for example, the range of the MDT measurement is a group of cells, and the serving cell of the UE belongs to a certain cell in the group of cells. The CU-UP selects the user to perform MDT measurement, and the CU-UP can assign an identifier to the selected UE, such as a trace reference session reference (TRSR). The identifier and the identifier of the MDT measurement (for example, a TR), and the combination of the two identifiers or the partial identifiers that respectively intercept the two identifiers is referred to as the identifier of the MDT of the access network. Of course, an MDT identifier may be additionally generated as long as the identifier can uniquely indicate an MDT measurement on the entire network.

The message transmitted by the CU-CP to the CU-UP may be a dedicated message for UE which is defined or a new message.

The MDT configuration message or other messages in step 1103 comprises one or more of the following information:

An identifier of the UE on the E1 interface including at least an identifier assigned by the CU-CP to the UE on the E1 interface.

An identifier of MDT, for example, a combination of TRSR and TR.

An IP address of a measurement center node (for example, a TCE). The measurement center node is an entity that receives the measurement report.

A mode of measurement, or a type of measurement, specifically refers to which measurement is performed. For example, the measurement type may be a packet delay measurement, a delay measurement of F1, and a delay measurement of DU.

A configuration of report, including information such as a report period, a report threshold and other information.

A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node identifier of the measurement report or an IP address and/or a tunnel identifier of a destination node of the measurement report.

A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1104: transmitting, by the CU-CP, a message to a core network, such as AMF, wherein the message carries an identifier information of the MDT.

The message transmitted to AMF by the CU-CP may be a cell traffic trace or other messages. The message is a dedicated message for UE. The message carries one or more of the following information:

An interface identifier of UE, for example, an identifier of NG interface which the core network AMF assigns for UE, an identifier of NG interface which the base station CU-CP assigns for UE.

The message carries an identifier of the MDT of the access network. As described above, the identifier of the MDT of the access network may be a combination of the TR and the TRSR, or an identifier capable of uniquely indicating an MDT on the entire network.

The message further carries an IP address of the measurement center node (such as a TCE).

The message further carries an identifier of the cell, indicating the identifier of the cell in which the UE is located.

The message further carries a privacy indication information indicating that the AMF needs to transmit the IMEI-TAC to the TCE.

Step 1105: transmitting, by the CU-UP, the MDT measurement result to the MDT central entity.

The CU-CP transmits the MDT measurement result to the MDT central entity according to the configuration of measurement reporting.

The following is a description of second scene.

Step 1106: transmitting, by a management node, an MDT activation message to the DU.

When the management mode requires to activate the MDT measurement, the MDT measurement is performed on DU, and the management node transmits a MDT activation message to DU. The MDT activation message contains a configuration information of the MDT. The configuration information of the MDT contains one or more of the following information:

- An identifier of the MDT measurement (for example, a trace reference, referred to as a TR). The identifier is a unique identifier of the entire network, including an identity of the PLMN and an ID. The identifier identifies a certain MDT measurement of the MDT.
- An IP address of a measurement center node (for example, a TCE), and the measurement center node is an entity that receives the measurement report.
- A mode of measurement, or a type of measurement, specifically refers to which measurement is performed. For example, the type of measurement may be a packet delay measurement, a delay measurement of F1, and a delay measurement of DU.
- A configuration of report, including information such as a report period, a report threshold and other information.
- A range of measurement, which can be a group of cells, i.e., containing a list of cell identities; or a list of routing area identities, such as a TAI list or a TAC list, or an entire PLMN range.
- A privacy indication information, also an anonymous indication information, indicating that the core network does not need to transmit the IMSI/IMEI of the UE to the TCE node, but does not transmit the IMSI of the UE to the TCE, or transmits the IMEI-TAC to the TCE.
- A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node identifier of the measurement report or an IP address and/or a tunnel identifier of a destination node of the measurement report.
- A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1107: transmitting, by the DU, a configuration request of MDT message to the CU-CP, the message carrying the configuration message.

The DU transmits a configuration request of MDT message to the CU-CP according to the configuration of the MDT measurement received in step 1106. The purpose of message is which UEs CU-CP selects for performing MDT measurement. The message is a public message, not a dedicated message for UE. The DU delays a messaged received in step 1106 to the CU-CP through the message.

Step 1108: selecting, by the CU-CP, a suitable user to perform the MDT measurement, and transmitting the MDT configuration message to the DU.

A message in step 1108 is a dedicated message for UE. The CU-CP selects a suitable user for performing the MDT measurement. First, the user wants to allow management-based MDT measurement, i.e., in the previous process, the CU-UP receives the indication information that the UE allows for management-based MDT measurement transmitted from the core network and/or a list of MDT PLMNs of UE. If the current serving PLMN of the UE is in the list of MDT PLMNs, and the location where the UE is located needs to be within the range of the MDT measurement, for example, the range of the MDT measurement is a group of cells, and the serving cell of the UE belongs to a certain cell in the group of cells. The CU-UP selects the user to perform MDT measurement, and the CU-UP can assign an identifier to the selected UE, such as a trace reference session reference (TRSR). The identifier and the identifier of the MDT measurement (for example, a TR), and the combination of the two identifiers or the partial identifiers that respectively intercept the two identifiers is referred to as the identifier of the MDT of the access network. Of course, an MDT identifier may be additionally generated as long as the identifier can uniquely indicate an MDT measurement on the entire network.

The message transmitted by the CU-CP to the DU may be an amendment request for UE in context or a new message. The message comprises one or more of the following information:

- An identifier of the UE on the F1 interface including at least an identifier assigned by the CU-CP to the UE on the F1 interface.
- An identifier of MDT, for example, a combination of TRSR and TR.
- An IP address of a measurement center node (for example, a TCE). The measurement center node is an entity that receives the measurement report.
- A mode of measurement, or a type of measurement, specifically refers to which measurement is performed. For example, the measurement type may be a packet delay measurement, a delay measurement of F1, and a delay measurement of DU.
- A configuration of report, including information such as a report period, a report threshold and other information.
- A configuration information, indicating where the measurement result is transmitted, the configuration information indicating to which entity the access network node should transmit the MDT measurement result, for example, the measurement result can be configured to be transmitted to another access network entity, or transmitted to the MDT central entity TCE. The configuration is performed by setting a destination node identifier of the measurement report or an IP address and/or a tunnel identifier of a destination node of the measurement report.

A configuration information, indicating whether the measurement result is reported to the MDT central entity, the configuration information indicating whether the measurement result is reported by the access network node to the MDT central entity TCE, and the configuration information may also be indicated by the IP address of the measurement center node (for example, a TCE).

Step 1109: transmitting, by the CU-CP, a message to a core network, such as AMF, wherein the message carries an identifier information of the MDT.

The message transmitted to AMF by the CU-CP may be a cell traffic trace or other messages. The message is a dedicated message for UE. The message carries one or more of the following information:

An interface identifier of UE, for example, an identifier of NG interface which the core network AMF assigns for UE, an identifier of NG interface which the base station CU-CP assigns for UE.

The message carries an identifier of the MDT of the access network. As described above, the identifier of the MDT of the access network may be a combination of the TR and the TRSR, or an identifier capable of uniquely indicating an MDT on the entire network.

The message further carries an IP address of the measurement center node (such as a TCE).

The message further carries an identifier of the cell, indicating the identifier of the cell in which the UE is located.

The message further carries a privacy indication information indicating that the AMF needs to transmit the IMEI-TAC to the TCE.

Step 1110: transmitting, by the DU, the MDT measurement result to the MDT central entity.

The DU transmits the MDT measurement result to the MDT central entity according to the configuration of measurement reporting.

FIG. 9 schematically shows a structural diagram of an access network node performing MDT measurement according to an exemplary embodiment of the present application. As shown in FIG. 9, the access network node receives the configuration information of the MDT, and the access network node performs the MDT configuration according to the configuration information, and the access network node can also receive the measurement result of the MDT transmitted by the other access network node, and the access network node integrates the received measurement result with its own measurement result to form a measurement result and transmits it to a MDT center node through an output module.

The foregoing descriptions are merely some preferred embodiments of the present application, and are not intended to limit the present application. It should be noted that, to those skilled in the art, any modifications, equivalents, improvements, etc., made without departing from the spirit and principle of the present application shall be regarded as falling into the protection scope of the present application.

The invention claimed is:

1. A method performed by a central unit user plane (CU-UP) of a base station in a wireless communication system, the method comprising:
receiving, from a central unit-control plane (CU-CP) of the base station through E1 interface, a context setup request message including information on a list of a management-based minimization of drive test (MDT) public land mobile network (PLMN);
identifying at least one user equipment (UE) for MDT based on the information on the list of the management-based MDT PLMN; and
transmitting, to the CU-CP of the base station, a cell traffic trace message including an identifier (ID) associated with a trace recording session reference (TRSR) assigned for the at least one UE.

2. The method of claim 1, wherein the context setup request further includes:
a CU-CP UE ID associated with the E1 interface; and
an ID of a serving PLMN.

3. The method of claim 1,
wherein the ID included in the cell traffic trace message is associated with a trace reference (TR) including a PLMN ID.

4. The method of claim 1,
wherein the cell traffic trace message further includes a trace collection entity (TCE) internet protocol (IP) address, and a privacy indicator.

5. The method of claim 1, wherein a serving PLMN of the at least one UE is within the list of the management-based MDT PLMN.

6. A central unit-user plane (CU-UP) of a base station in a wireless communication system, the CU-UP comprising:
a transceiver; and
a controller coupled with the transceiver and configured to:
receive, from a central unit-control plane (CU-CP) of the base station through E1 interface, a context setup request message including information on a list of a management-based minimization of drive test (MDT) public land mobile network (PLMN),
identify at least one user equipment (UE) for MDT based on the information on the list of the management-based MDT PLMN, and
transmit, to the CU-CP of the base station, a cell traffic trace message including an identifier (ID) associated with a trace recording session reference TRSR) assigned for the at least one UE.

7. The method of claim 1, further comprising:
receiving, from an element manager (EM), an activation message including information for configuring a UE measurement,
wherein the information for configuring the UE measurement includes information on an area scope, and
wherein the at least one UE for the MDT is identified based on the information on the area scope and the information on the list of the management-based MDT PLMN.

8. The CU-UP of claim 6, wherein a serving PLMN of the at least one UE is within the list of the management-based MDT PLMN.

9. The CU-UP of claim 8, wherein the context setup request message further includes:
a CU-CP UE ID associated with the E1 interface; and
an ID of a serving PLMN.

10. The CU-UP of claim 8,
wherein the ID included in the cell traffic trace message is associated with a trace reference (TR) including a PLMN ID.

11. The CU-UP of claim 8,
wherein the cell traffic trace message further includes a trace collection entity (TCE) internet protocol (IP) address, and a privacy indicator.

12. The CU-UP of claim 8,
wherein the controller is further configured to:
receive, from an element manager (EM), an activation message including information for configuring a UE measurement,
wherein the information for configuring the UE measurement includes information on an area scope, and
wherein the at least one UE for the MDT is identified based on the information on the area scope and the information on the list of the management-based MDT PLMN.

13. A method performed by a central unit-control plane (CU-CP) of a base station in a wireless communication system, the method comprising:
transmitting, to a central unit-user plane (CU-UP) of the base station through E1 interface, a context setup request message including information on a list of a management-based minimization of drive test (MDT) public land mobile network (PLMN); and
receiving, from the CU-UP of the base station, a cell traffic trace message including an identifier (ID) associated with a trace recording session reference (TRSR) assigned for at least one user equipment (UE),
wherein the at least one UE for MDT is associated with the information on the list of the management-based MDT PLMN.

14. The method of claim 13, wherein the context setup request message further includes:
a CU-CP UE ID associated with the E1 interface; and
an ID of a serving PLMN.

15. The method of claim 13, wherein the ID included in the cell traffic trace message is associated with a trace reference (TR) including a PLMN ID.

16. The method of claim 13,
wherein the cell traffic trace message further includes a trace collection entity (TCE) internet protocol (IP) address, and a privacy indicator, and
wherein a serving PLMN of the at least one UE is within the list of the management-based MDT PLMN.

17. A central unit-control plane (CU-CP) of a base station in a wireless communication system, the CU-CP comprising:
a transceiver; and
a controller coupled with the transceiver and configured to:
transmit, to a central unit-user plane (CU-UP) of the base station through E1 interface, a context setup request message including information on a list of a management-based minimization of drive test (MDT) public land mobile network (PLMN), and
receive, from the CU-UP of the base station, a cell traffic trace message including an identifier (ID) associated with a trace recording session reference (TRSR) assigned for at least one user equipment (UE),
wherein the at least one UE for MDT is associated with the information on the list of the management-based MDT PLMN.

18. The CU-CP of claim 17, wherein the context setup request message further includes:
a CU-CP UE ID associated with the E1 interface; and
an ID of a serving PLMN.

19. The CU-CP of claim 17, wherein the ID included in the cell traffic trace message is associated with a trace reference (TR) including a PLMN ID.

20. The CU-CP of claim 17,
wherein the cell traffic trace message further includes a trace collection entity (TCE) internet protocol (IP) address, and a privacy indicator, and
wherein a serving PLMN of the at least one UE is within the list of the management-based MDT PLMN.

* * * * *